United States Patent
Nishio et al.

(10) Patent No.: US 7,133,467 B2
(45) Date of Patent: Nov. 7, 2006

(54) DEMODULATION APPARATUS AND DEMODULATION METHOD

(75) Inventors: Akihiko Nishio, Yokosuka (JP); Hideo Fujii, Yokosuka (JP); Masaki Hayashi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 876 days.

(21) Appl. No.: 10/148,289

(22) PCT Filed: Sep. 27, 2001

(86) PCT No.: PCT/JP01/08415

§ 371 (c)(1),
(2), (4) Date: May 29, 2002

(87) PCT Pub. No.: WO02/29998

PCT Pub. Date: Apr. 11, 2002

(65) Prior Publication Data

US 2002/0196871 A1    Dec. 26, 2002

(30) Foreign Application Priority Data

Sep. 29, 2000   (JP) ............................. 2000-300148
Sep. 29, 2000   (JP) ............................. 2000-300790

(51) Int. Cl.
*H04L 27/06*    (2006.01)
(52) U.S. Cl. ................... 375/316; 375/324; 329/316
(58) Field of Classification Search ............. 375/140, 375/147, 148, 150, 316, 343, 322, 324, 325, 375/340; 329/316, 320, 315, 318; 455/130, 455/132, 135, 140, 143, 144
See application file for complete search history.

(56) References Cited

U.S. PATENT DOCUMENTS

| | | | | |
|---|---|---|---|---|
| 5,230,077 A * | 7/1993 | Raith | ........................... | 455/65 |
| 5,999,560 A * | 12/1999 | Ono | ........................... | 375/148 |
| 6,377,559 B1 * | 4/2002 | Haardt | ........................ | 370/326 |
| 6,778,592 B1 * | 8/2004 | Haga et al. | .................. | 375/148 |
| 2004/0190603 A1 * | 9/2004 | Dabak et al. | ................ | 375/148 |

FOREIGN PATENT DOCUMENTS

EP        1128564 A1    8/2001

(Continued)

OTHER PUBLICATIONS

Nam, J et al.: "Combined Beamformer-Rake Receiver and Decorrelating Detector For Asynchronous CDMA Systems", Vehicular Technology Conference, 1999 IEEE, Houston, TX, USA, May 16-20, 1999, vol. 3, pp. 2230-2234, XP010342299.

(Continued)

*Primary Examiner*—Pankaj Kumar
*Assistant Examiner*—Naheed Ejaz
(74) *Attorney, Agent, or Firm*—Stevens, Davis, Miller & Mosher, LLP

(57) ABSTRACT

The number of spreading codes multiplexed in a received signal is detected, and switches 4 and 5 are switched to the RAKE demodulation section 2 side if the detected number of spreading codes is less than a predetermined threshold value, and to the JD demodulation section 3 side if greater than or equal to the predetermined threshold value. As a result, joint detection demodulation is used only when the number of multiplexed spreading codes is large—that is, when the number of users is large—and consequently power can be saved during demodulation.

2 Claims, 17 Drawing Sheets

FOREIGN PATENT DOCUMENTS

| | | |
|---|---|---|
| EP | 1128569 | 8/2001 |
| JP | 10051356 | 2/1998 |
| JP | 10257021 | 9/1998 |
| JP | 2000013360 | 1/2000 |
| JP | 2000216703 | 8/2000 |
| JP | 2000 252962 | 9/2000 |
| JP | 2000261412 | 9/2000 |
| JP | 2001251236 | 9/2001 |
| JP | 2001285254 | 10/2001 |
| WO | 9901946 | 1/1999 |

OTHER PUBLICATIONS

International Search Report dated Dec. 18, 2001.

B. Steiner; "Interference Cancellation vs. Channel Equalization and Joint Detection for the Downlink of C/TDMA Mobile Radio Concepts", Proceedings of EPMCC Conference Germany 1997, pp. 253-260.

H.R. Karimi; "Efficient Multi-Rate Multi-User Detection For The Asynchronous WCDMA Uplink", VTC'1999 IEEE, pp. 593-597.

Japanese Office Action dated Mar. 18, 2003 with English translation.

* cited by examiner

DEMODULATION APPARATUS AND DEMODULATION METHOD

TECHNICAL FIELD

The present invention relates to a demodulation apparatus and demodulation method suitable for use in a CDMA (Code Division Multiple Access) mobile communication system.

BACKGROUND ART

Conventionally, Joint Detection (hereinafter referred to as "JD") demodulation is used as a demodulation method in CDMA mobile communications. JD demodulation is a demodulation method that uses an interference cancellation equalization method that obtains a signal free of inter-code interference or effects of interference on other users. Specifically, a demodulated signal is obtained by performing computation that cancels inter-code interference and effects of interference on other users from a received signal by using a delay profile obtained by means of channel estimation and spreading codes for all users.

FIG. 24 is a block diagram showing the schematic configuration of a conventional JD demodulation apparatus. A conventional JD demodulation apparatus is composed of a channel estimation section 50 and a JD demodulation section 51. The JD demodulation section 51 is composed of a cross-correlation matrix generation section 52 and an interference cancellation computation section 53.

The channel estimation section 50 performs channel estimation processing using a known signal sequence included in a received baseband signal, and generates a delay profile for all multiplex codes of all multiplex users. The cross-correlation matrix generation section 52 of the JD demodulation section 51 generates a cross-correlation matrix based on a delay profile generated by the channel estimation section 50 and spreading code information for all multiplex codes of all multiplexed users. Using the cross-correlation matrix generated by the cross-correlation matrix generation section 52 and the received baseband signal, the interference cancellation computation section 53 performs computation that cancels inter-code interference and effects of interference on other users. The above spreading code information can be obtained from a separately provided spreading code estimation section (not shown) or from a higher layer.

Information concerning conventional JD demodulation is given in, for example, "Interference Cancellation vs. Channel Equalization and Joint Detection for the Downlink of C/TDMA Mobile Radio Concepts" (Bernd Steiner, Proceedings of EPMCC Conference Germany 1997, No.145, pp.253–260) or "EFFICIENT MULTI-RATE MULTI-USER DETECTION FOR THE ASYNCHRONOUS WCDMA UPLINK" (H. R. Karimi, VTC'99, pp.593–597).

However, with a demodulation apparatus using conventional JD demodulation, while the performance of JD demodulation is good compared with normal RAKE demodulation, there are problems in that the amount of computation is large, and power consumption is high.

DISCLOSURE OF INVENTION

It is an object of the present invention to provide a demodulation apparatus and demodulation method that enable power-saving to be achieved while using JD demodulation.

This object is achieved by providing for switching between RAKE demodulation and JD demodulation to be performed in accordance with reception conditions, and using JD demodulation only when necessary.

BEST MODE FOR CARRYING OUT THE INVENTION

With reference now to the accompanying drawings, embodiments of the present invention will be explained in detail below.

(Embodiment 1)

Figure 1:
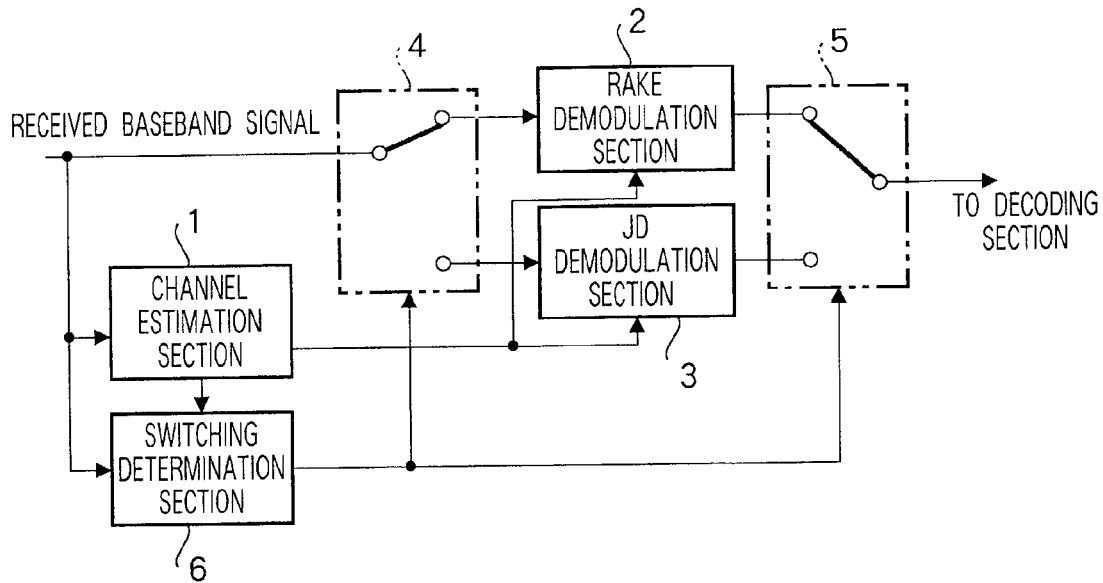
FIG. 1 is a block diagram showing the configuration of a demodulation apparatus according to Embodiment 1 of the present invention.

FIG. 1 is a block diagram showing the configuration of a demodulation apparatus according to Embodiment 1 of the present invention.

In FIG. 1, a demodulation apparatus according to this embodiment comprises a channel estimation section 1, a RAKE demodulation section 2, a JD (joint detection) demodulation section 3, switches 4 and 5 that switch between the RAKE demodulation section 2 and JD demodulation section 3, and a switching determination section 6 that performs switching of switches 4 and 5 based on the number of spreading codes multiplexed in a received signal. The number of spreading codes corresponds to the reception conditions referred to in claim 1.

The channel estimation section 1 performs channel estimation using a known signal sequence (for example, a midamble) included in a received signal, generates a delay profile for all users, and inputs this to the RAKE demodulation section 2, JD demodulation section 3, and switching determination section 6. The switching determination section 6 detects the number of spreading codes multiplexed in the received signal, and compares the detected number of spreading codes with a predetermined threshold value. If this comparison shows that the number of detected codes is less than the predetermined threshold value, switches 4 and 5 are switched to the RAKE demodulation section 2 side. If, on the other hand, the number of detected codes is greater than or equal to the predetermined threshold value, switches 4 and 5 are switched to the JD demodulation section 3 side.

As interference increases in accordance with the number of spreading codes multiplexed in a signal, although the use of JD demodulation results in a major improvement in performance, as the number of spreading codes decreases interference also decreases, and thus the effect of JD demodulation is reduced. In such a case, RAKE demodulation is effective. Either a value notified from a higher layer, or the number of spreading codes estimated in channel estimation, may be used as the number of spreading codes.

Figure 2:
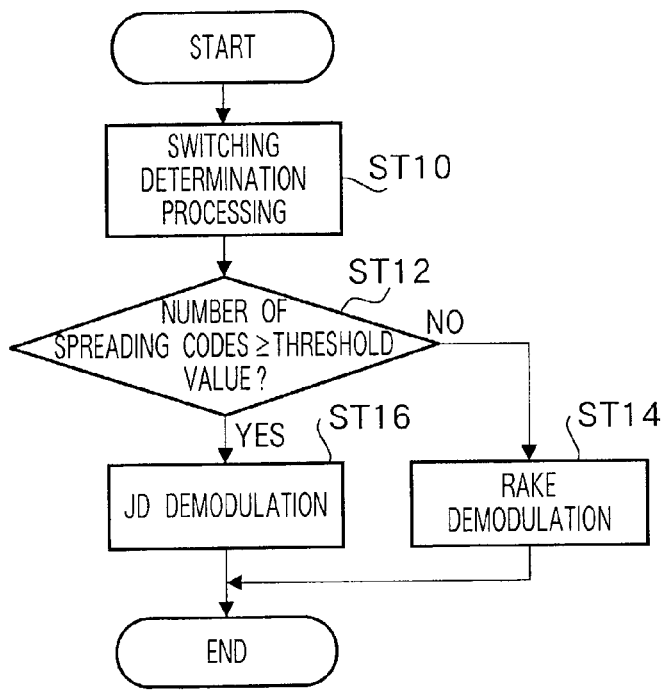
FIG. 2 is a flowchart showing the operation of a demodulation apparatus according to Embodiment 1 of the present invention.

Next, the operation of a demodulation apparatus according to this embodiment will be described with reference to the flowchart shown in FIG. 2.

First, the number of spreading codes multiplexed in the received signal is determined (Step 10). Then the determined number of spreading codes is compared with a predetermined threshold value (Step 12), and if this comparison shows that the number of spreading codes is less than the predetermined threshold value (that is, in the NO case), switches 4 and 5 are switched to the RAKE demodulation section 2 side and RAKE demodulation is selected (Step 14). If, on the other hand, the number of spreading codes is greater than or equal to the predetermined threshold value (that is, in the YES case), switches 4 and 5 are switched to the JD demodulation section 3 side and JD demodulation is selected (Step 16). The result of demodulation by means of the selected demodulation method is input to a decoding section (not shown).

Thus, according to a demodulation apparatus of this embodiment, switching between RAKE demodulation and JD demodulation is performed based on the number of spreading codes multiplexed in a received signal. That is to say, when the number of spreading codes is small and adequate reception quality can be obtained by means of RAKE demodulation, the system switches to the RAKE demodulation section 2, and when the number of spreading codes is large and adequate reception quality cannot be obtained by means of RAKE demodulation, the system switches to the JD demodulation section 3.

Therefore, power can be saved during demodulation by using JD demodulation, which incurs high power consumption, only when the number of spreading codes multiplexed in a received signal is large—that is to say, when there are a large number of users.

(Embodiment 2)

With the above-described demodulation apparatus according to Embodiment 1, the condition for switching between JD demodulation and RAKE demodulation is "the number of spreading codes multiplexed in a received signal", but with a demodulation apparatus according to this embodiment, the switching condition is "the number of transmission paths". The configuration of this apparatus is identical to that of the demodulation apparatus in FIG. 1, and therefore FIG. 1 will again be referred to.

The channel estimation section 1 determines the number of transmission paths at the time of channel estimation generation. The switching determination section 6 compares the number of transmission paths determined by the channel estimation section 1 with a predetermined threshold value, and if the number of transmission paths is less than the predetermined threshold value, the system switches to RAKE demodulation. If, on the other hand, the number of transmission paths is greater than or equal to the predetermined threshold value, the system switches to JD demodulation. Possible methods of setting the threshold value are to set the total number of paths for all users, or to set the number of paths on a user-by-user basis. If there are a large number of transmission paths, interference will be proportionally greater for one path, and so the performance improving effect of JD demodulation will be great. In contrast, as the number of transmission paths is decreased, the interference is decreased, and so the effect of JD is small. Therefore, if JD demodulation is used only when the number of transmission paths is large, power can be saved while maintaining reception quality. The number of transmission paths corresponds to the reception conditions referred to in claim 1.

Thus, according to a demodulation apparatus of this embodiment, switching between RAKE demodulation and JD demodulation is performed based on the number of transmission paths, and JD demodulation, which incurs high power consumption, is selected only when the number of transmission paths is large, thereby enabling power to be saved during demodulation.

(Embodiment 3)

With the above-described demodulation apparatus according to Embodiment 1, the condition for switching between JD demodulation and RAKE demodulation is "the number of spreading codes multiplexed in a received signal", and with the above-described demodulation apparatus according to Embodiment 2, the switching condition is "the number of transmission paths", but with a demodulation apparatus according to this embodiment, the two above-described conditions are used. The configuration of this apparatus is identical to that of the demodulation apparatus in FIG. 1, and therefore FIG. 1 will again be referred to.

The switching determination section 6 determines whether or not the condition that the result of multiplying together the number of spreading codes and number of paths detected by the channel estimation section 1 exceeds a predetermined threshold value is satisfied. If this condition is satisfied, the system switches to the JD demodulation section 3, and if this condition is not satisfied, the system switches to the RAKE demodulation section 2.

Thus, according to a demodulation apparatus of this embodiment, switching between RAKE demodulation and JD demodulation is performed based on the number of spreading codes multiplexed in a received signal and the number of transmission paths, and JD demodulation, which incurs high power consumption, is selected only when the result of multiplying together the number of spreading codes and the number of paths detected by the channel estimation section 1 is greater than or equal to a predetermined threshold value, thereby enabling power to be saved during demodulation.

(Embodiment 4)

Figure 3:
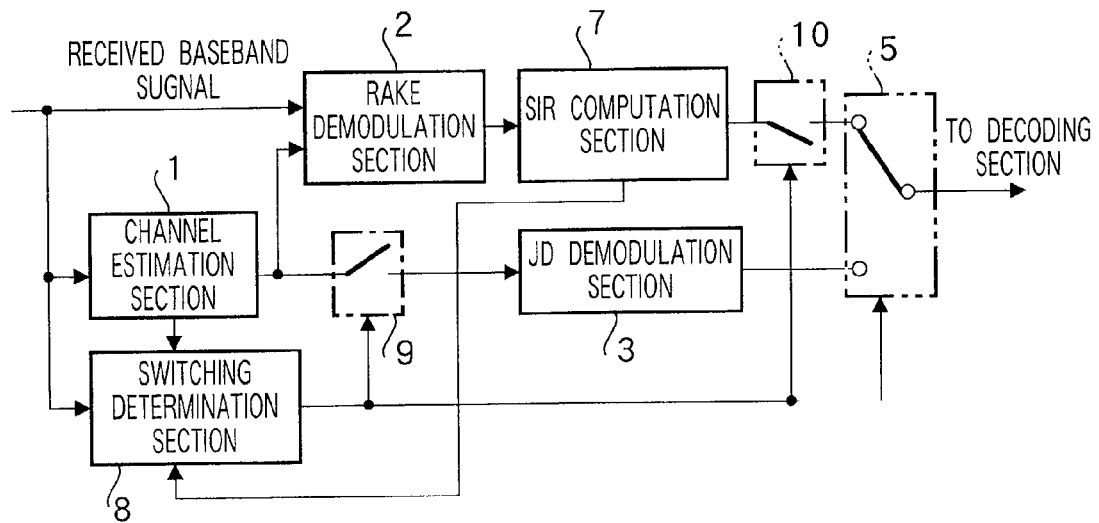
FIG. 3 is a block diagram showing the configuration of a demodulation apparatus according to Embodiment 4 of the present invention.

FIG. 3 is a block diagram showing the configuration of a demodulation apparatus according to Embodiment 4 of the present invention. Parts in FIG. 3 identical to those in FIG. 1 are assigned the same codes as in FIG. 1.

As shown in FIG. 3, a demodulation apparatus according to this embodiment has a configuration whereby the condition for switching between JD demodulation and RAKE demodulation is the SIR (signal to interference ratio) of RAKE demodulation results for a number of symbols, and the system switches to RAKE demodulation if that SIR is greater than or equal to a predetermined threshold value, and switches to JD demodulation if the SIR is less than the predetermined threshold value. The SIR is calculated by an SIR computation section 7. A switching determination section 8 performs switching between the RAKE demodulation section 2 and JD demodulation section 3 based on the computation result of the SIR computation section 7. In order to perform demodulation method switching determination based on an SIR, it is necessary to monitor the SIR constantly. Therefore, with a demodulation apparatus according to this embodiment, provision is made for the output of the channel estimation section 1 to be input constantly to the RAKE demodulation section 2 so that the SIR can be monitored even when the system switches to the JD demodulation section 3 side.

Switching between the RAKE demodulation section 2 and JD demodulation section 3 is performed by means of a switch 5, a switch 9 located between the channel estimation section 1 and JD demodulation section 3, and a switch 10 located between the SIR computation section 7 and switch 5. When the RAKE demodulation section 2 is to be used, switch 5 is switched to the RAKE demodulation section 2 side, switch 9 is opened, and switch 10 is closed. When the JD demodulation section 3 is to be used, switch 5 is switched to the JD demodulation section 3 side, switch 9 is closed, and switch 10 is opened.

Demodulation method switching differs according to whether it is applied to a mobile device or to a base station. Operation in the case of application to a mobile device is shown in the flowchart in FIG. 4, and operation in the case of application to a base station is shown in the flowchart in FIG. 5.

[When Applied to a Mobile Device]

Figure 4:
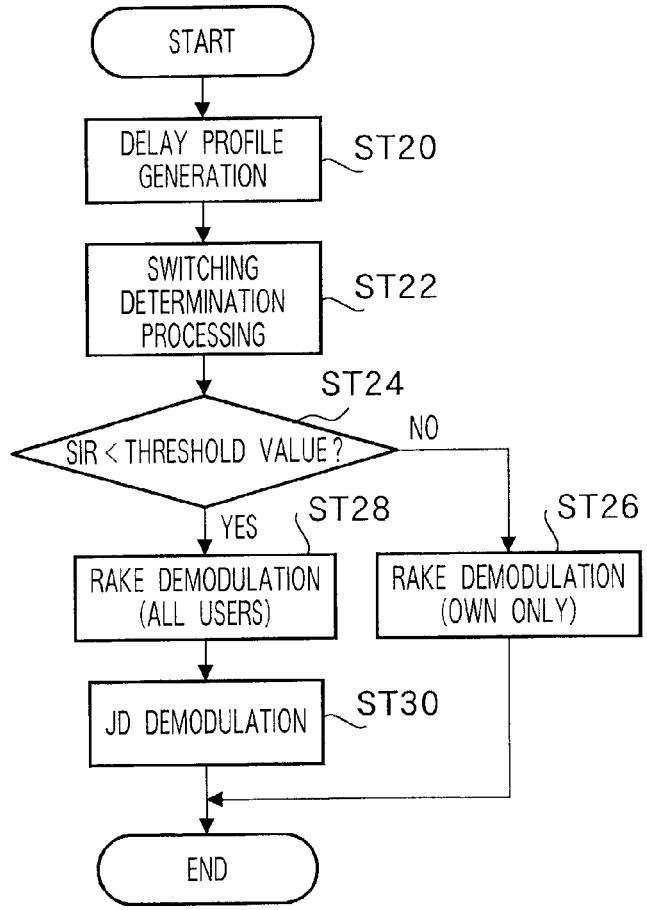
FIG. 4 is a flowchart showing the operation when a demodulation apparatus according to Embodiment 4 of the present invention is used in a mobile device.

As shown in the flowchart in FIG. 4, a delay profile is generated and then processing for switching determination (SIR measurement, etc.) is performed (Step 20, Step 22). After processing for switching determination has been performed, the SIR is compared with a predetermined threshold value (Step 24). If this comparison shows that the SIR is greater than or equal to the predetermined threshold value (that is, in the NO case), a signal that switches switch 5 to the RAKE demodulation section 2 side is output, and signals that open switch 9 and close switch 10 are output, thereby selecting RAKE demodulation (Step 26). If, on the other hand, the SIR is less than the predetermined threshold value (that is, in the YES case), a signal that switches switch 5 to the JD demodulation section 3 side is output, and signals that close switch 9 and open switch 10 are output, thereby selecting JD demodulation (Steps 28 and 30). In JD demodulation, JD demodulation is performed after performing RAKE demodulation for all users.

In the case of application to a mobile device, RAKE demodulation need only be performed for that device, but with JD demodulation, it is necessary for RAKE demodulation to be performed for all users before this JD demodulation is carried out. That is to say, since JD demodulation is performed when the SIR is less than the predetermined threshold value, the JD demodulation section 3 carries out RAKE demodulation for all users. On the other hand, since RAKE demodulation is performed when the SIR is greater than or equal to the predetermined threshold value, the RAKE demodulation section 2 carries out RAKE demodulation for the user of that device. The result of demodulation by means of the selected demodulation method is input to a decoding section (not shown).

[When Applied to a Base Station]

In a base station, RAKE demodulation is performed for all operational mobile devices within the cell, and therefore when an SIR is less than a predetermined threshold value, JD demodulation is carried out directly.

Figure 5:
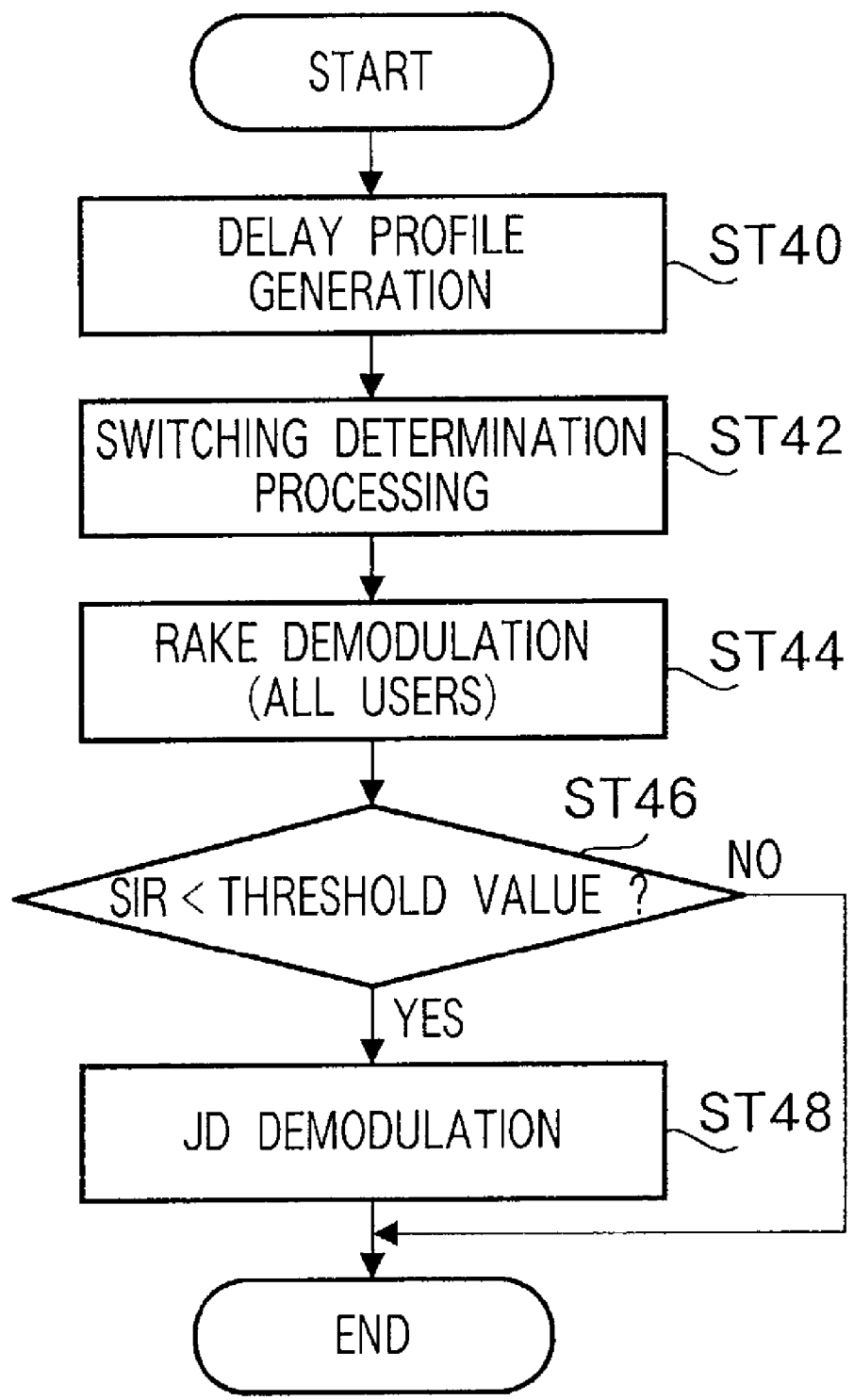
FIG. 5 is a flowchart showing the operation when a demodulation apparatus according to Embodiment 4 of the present invention is used in a base station.

As shown in the flowchart in FIG. 5, a delay profile is generated, and then processing for switching determination is performed and SIR measurement is performed (Step 40, Step 42). After SIR measurement has been performed, RAKE demodulation is carried out for all users (Step 44). Then the SIR is compared with a predetermined threshold value (Step 46). If this comparison shows that the SIR is greater than or equal to the predetermined threshold value (that is, in the NO case), this processing is terminated directly. If, on the other hand, the SIR is less than the predetermined threshold value (that is, in the YES case), a signal that switches switch 5 to the JD demodulation section 3 side is output, and signals that close switch 9 and open switch 10 are output, thereby selecting JD demodulation (Step 48).

Thus, in the case of RAKE demodulation, in a mobile device RAKE demodulation is performed for that user signal, whereas in a base station RAKE demodulation is performed for all user signals. In the case of JD demodulation, on the other hand, in RAKE demodulation, RAKE demodulation is performed for all users both in a mobile device and in a base station. The JD demodulation section 3 performs computation that cancels inter-code interference and effects of interference on other users, using a delay profile, RAKE demodulation results, and the spreading codes of all users. The SIR corresponds to the reception conditions referred to in claim 1.

Thus, according to a demodulation apparatus of this embodiment, switching between RAKE demodulation and JD demodulation is performed based on the SIR of RAKE demodulation results for a number of symbols, and JD demodulation, which incurs high power consumption, is used only when the SIR is less than a predetermined threshold value, thereby enabling power to be saved during demodulation.

(Embodiment 5)

Figure 6:
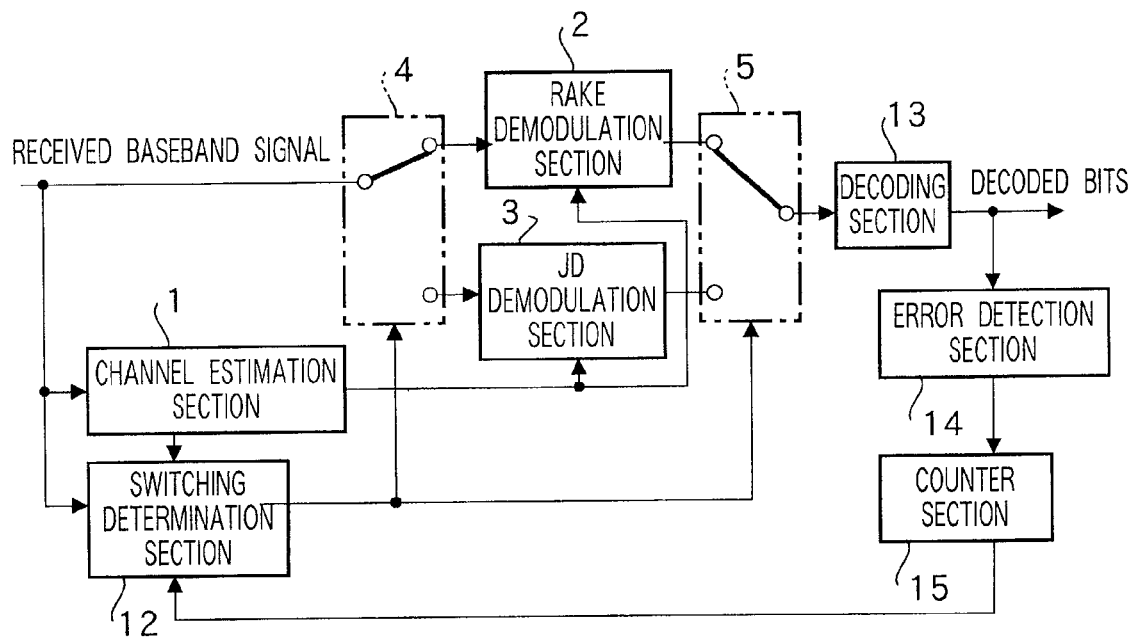
FIG. 6 is a block diagram showing the configuration of a demodulation apparatus according to Embodiment 5 of the present invention.
Figure 7:
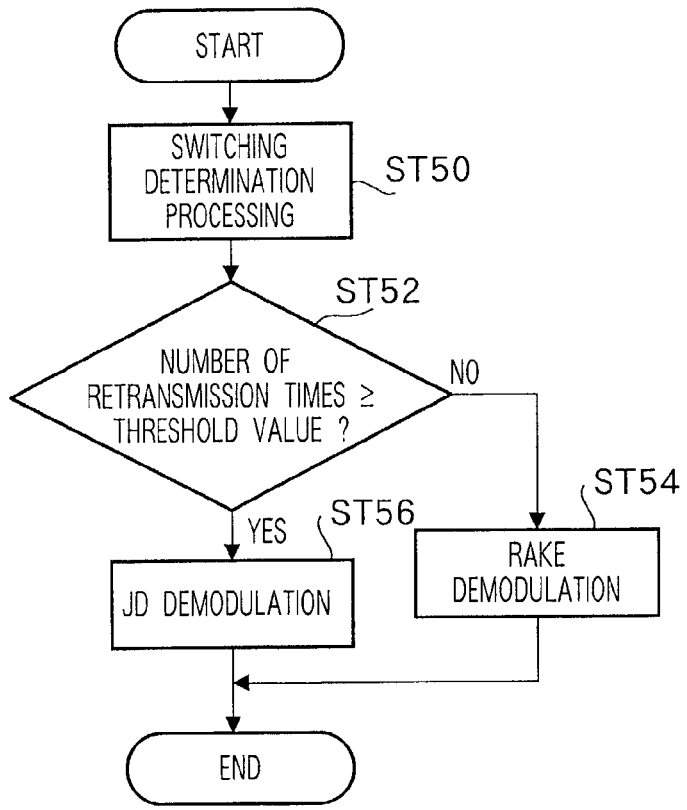
FIG. 7 is a flowchart showing the operation of a demodulation apparatus according to Embodiment 5 of the present invention.

FIG. 6 is a block diagram showing the configuration of a demodulation apparatus according to Embodiment 5 of the present invention, and FIG. 7 is a flowchart showing the operation of a demodulation apparatus according to this embodiment. Parts in FIG. 6 identical to those in FIG. 1 are assigned the same codes as in FIG. 1.

A demodulation apparatus according to this embodiment has a configuration whereby, in communications in which retransmission control is performed by means of the Automatic Repeat Request (ARQ) method, the condition for switching between JD demodulation and RAKE demodulation is "the number of ARQ retransmissions", and the system switches to RAKE demodulation if that number of retransmission times is less than a predetermined threshold value, and switches to JD demodulation if that number of retransmission times is greater than or equal to the predetermined threshold value. The number of retransmission times can be found by detecting errors in decoded bits output from a decoding section 13 with an error detection section 14 and counting these errors with a counter section 15. A switching determination section 12 performs demodulation method switching based on the number of retransmission times. For example, it may be that RAKE demodulation is selected initially to suppress power consumption, and when reception quality does not meet a reference level and retransmission is performed, the system switches to JD demodulation if the number of retransmission times is greater than or equal to a predetermined threshold value. The number of ARQ retransmissions corresponds to the reception conditions referred to in claim 1.

FIG. 7 is a flowchart showing the operation of a demodulation apparatus according to this embodiment.

In this flowchart, processing is first performed for the purpose of switching determination, and measurement of the number of retransmission times is carried out (Step 50). After the number of retransmission times has been measured, the measured number of retransmission times is compared with a predetermined threshold value (Step 52). If this comparison shows that the number of retransmission times is less than the predetermined threshold value (that is, in the NO case), RAKE demodulation is selected by switching switches 4 and 5 to the RAKE demodulation section 2 side (Step 54). If, on the other hand, the number of retransmission times is greater than or equal to the predetermined threshold value (that is, in the YES case), JD demodulation is selected by switching switches 4 and 5 to the JD demodulation section 3 side (Step 56).

Thus, according to a demodulation apparatus of this embodiment, switching between RAKE demodulation and JD demodulation is performed based on the number of ARQ retransmissions, and JD demodulation, which incurs high power consumption, is used only when that number of retransmission times is greater than or equal to a predetermined threshold value, thereby enabling power to be saved during demodulation. The number of retransmission times may also be determined using a value notified by a higher layer.

(Embodiment 6)

Figure 8:
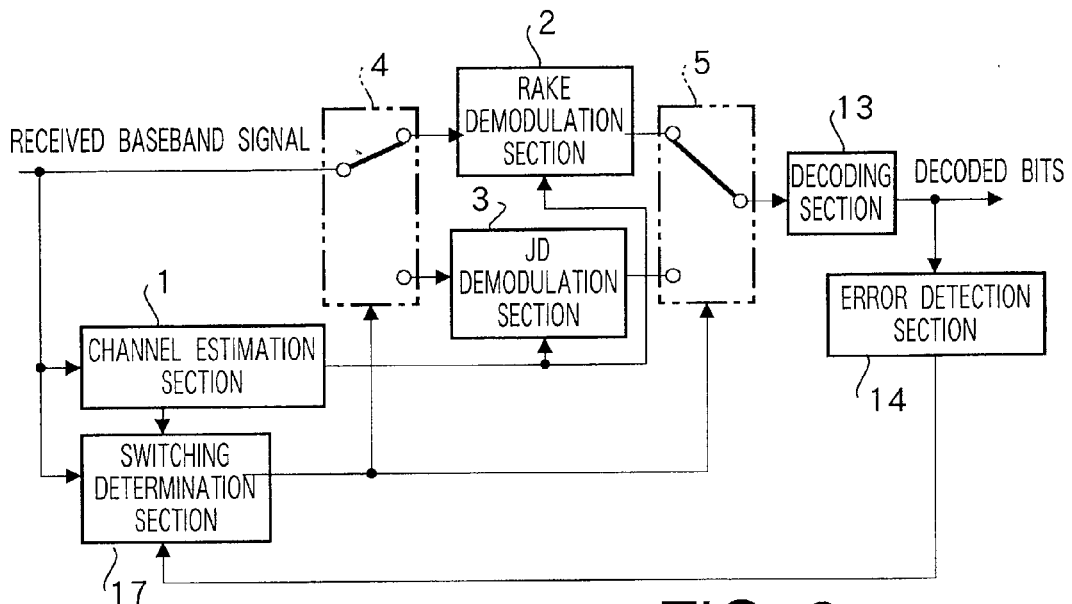
FIG. 8 is a block diagram showing the configuration of a demodulation apparatus according to Embodiment 6 of the present invention.

FIG. 8 is a block diagram showing the configuration of a demodulation apparatus according to Embodiment 6 of the present invention. Parts in FIG. 8 identical to those in FIG. 6 are assigned the same codes as in FIG. 6.

A demodulation apparatus according to this embodiment has a configuration whereby the threshold value used for JD demodulation/RAKE demodulation switching determination is changed in accordance with errors in decoded bits. Decoded bit errors are detected by the error detection section 14.

Figure 9:
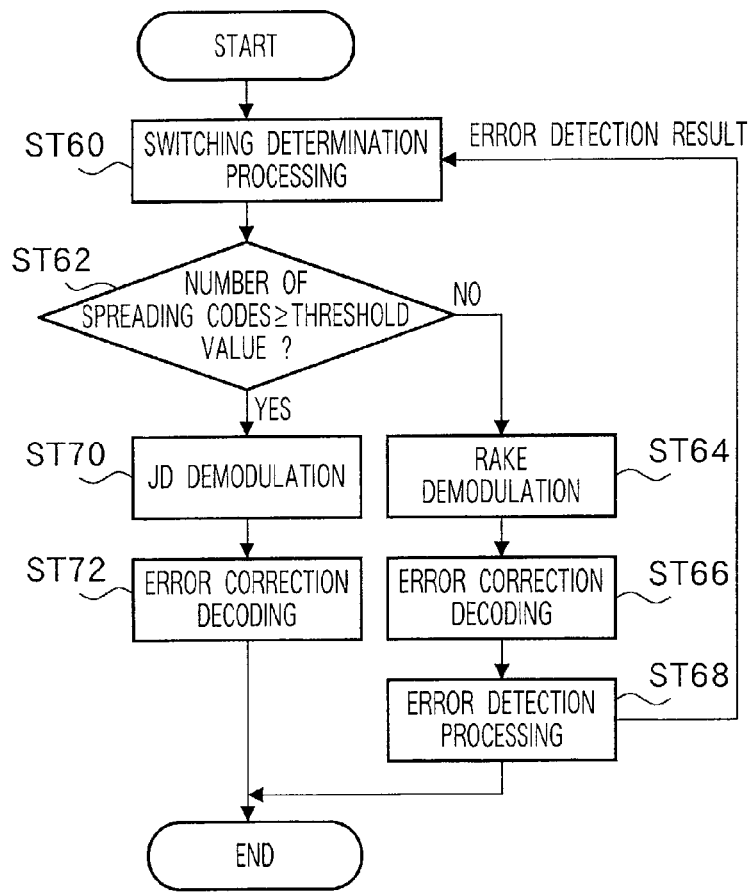
FIG. 9 is a flowchart showing the operation of a demodulation apparatus according to Embodiment 6 of the present invention.

FIG. 9 is a flowchart showing the operation of a demodulation apparatus according to this embodiment.

In this flowchart, processing is first performed for the purpose of switching determination, and the number of spreading codes multiplexed in a received signal is detected (Step 60). After detection of the number of spreading codes, the detected number of spreading codes is compared with a predetermined threshold value (Step 62). If this comparison shows that the number of spreading codes is less than the predetermined threshold value, switches 4 and 5 are switched to the RAKE demodulation section 2 side and RAKE demodulation is performed (Step 64). Then, after RAKE demodulation, error correction decoding is carried out (Step 66), followed by error detection processing (Step 68). If a decoded bit error is detected by the error detection section 14, that result is input to a switching determination section 17. When the error detection result is input from the error detection section 14, the switching determination section 17 uses that result to control the threshold value that is the criterion for demodulation method switching. For example, if an error is detected even though a switch has been made to the RAKE demodulation section 2 with the current threshold value, the current threshold value is determined not to be appropriate for the current reception conditions, and is decremented by a predetermined value. For example, a threshold value of "40" will be changed to "35". The switching determination section 17 carries out this processing repeatedly until errors are no longer detected. Then, when errors are no longer detected, the current threshold value is incremented successively by a predetermined value after the elapse of a predetermined interval from that point in time, or after switching determination processing has been performed a predetermined number of times since the point in time at which errors ceased to be detected. This processing is carried out until the value immediately prior to detection of an error.

If, on the other hand, it is determined in Step 62 that the number of spreading codes is greater than or equal to the predetermined threshold value, switches 4 and 5 are switched to the JD demodulation section 3 side and JD demodulation is performed (Step 70). After JD demodulation, error correction decoding is performed (Step 72), and this processing is terminated.

Thus, according to a demodulation apparatus of this embodiment, the threshold value that is the criterion for demodulation method switching is changed in accordance with errors in decoded bits, thus enabling a fixed reception quality to be constantly maintained.

In this embodiment, switching determination is performed based on the number of spreading codes, but switching determination may also be determined based on the number of transmission paths, a calculated SIR value, or the number of ARQ retransmissions.

(Embodiment 7)

Figure 10:
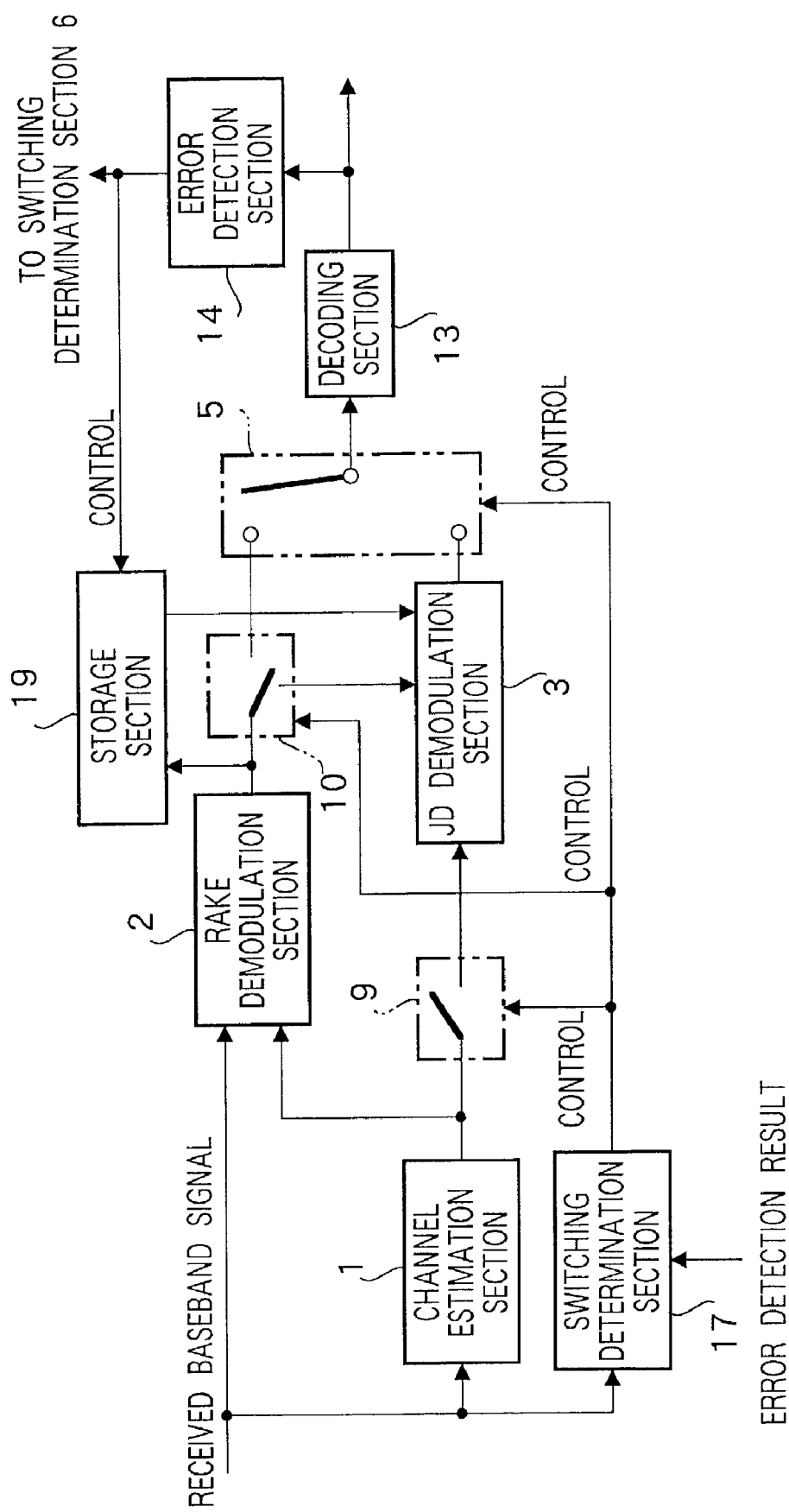
FIG. 10 is a block diagram showing the configuration of a demodulation apparatus according to Embodiment 7 of the present invention.

FIG. 10 is a block diagram showing the configuration of a demodulation apparatus according to Embodiment 7 of the present invention. Parts in FIG. 10 identical to those in FIG. 3 are assigned the same codes as in FIG. 3.

A demodulation apparatus according to this embodiment is provided with a storage section 19 that stores post-RAKE-demodulation symbol information, and if an error is detected during RAKE demodulation, this post-RAKE-demodulation symbol information stored in the storage section 19 is used for interference cancellation computation in the JD demodulation section 3.

A switching determination section 17 detects the number of spreading codes multiplexed in a received signal. Then the system switches to the RAKE demodulation section 2 if the detected number of spreading codes is less than a predetermined threshold value, or switches to the JD demodulation section 3 if the detected number of spreading codes is greater than or equal to the predetermined threshold value. After a switch is made to the RAKE demodulation section 2 when the detected number of spreading codes is less than the predetermined threshold value, if a decoded bit error is detected by an error detection section 14, that result is input to the switching determination section 17. When the error detection result is input from the error detection section 14, the switching determination section 17 controls switches 5, 9, and 10 to switch from the RAKE demodulation section 2 to the JD demodulation section 3. The error detection result from the error detection section 14 is also input to the storage section 19, and RAKE demodulated symbol information stored in the storage section 19 is read and input to the JD demodulation section 3. The JD demodulation section 3 performs interference cancellation computation based on the post-RAKE-demodulation symbol information from the storage section 19 and a delay profile from the channel estimation section 1, and inputs the result to a decoding section 13. Part of the computation in JD demodulation can be omitted by using post-RAKE-demodulation symbols in JD demodulation. By this means, power can be saved in demodulation.

Figure 11:
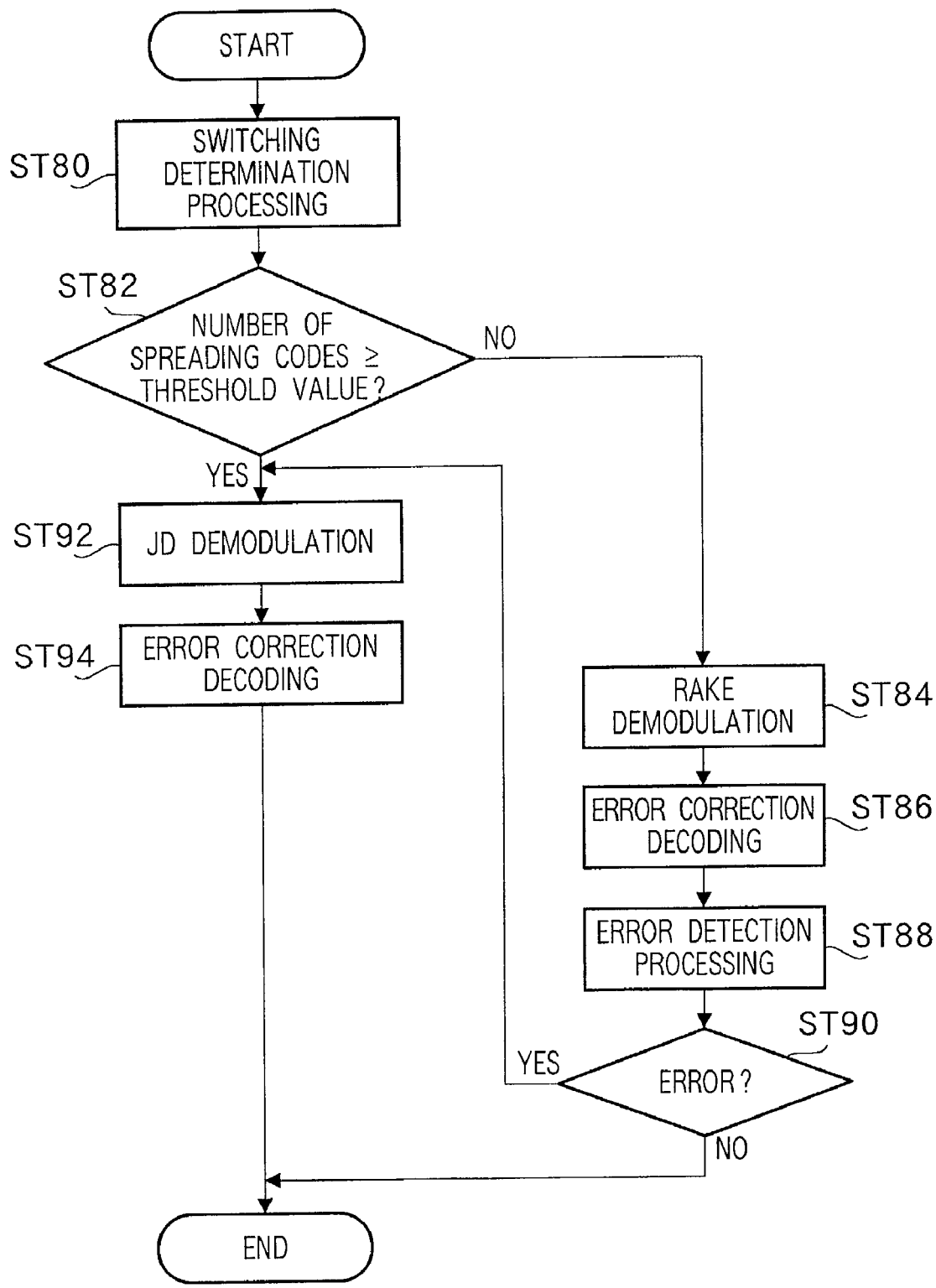
FIG. 11 is a flowchart showing the operation of a demodulation apparatus according to Embodiment 7 of the present invention.

FIG. 11 is a flowchart showing the operation of a demodulation apparatus according to this embodiment.

In this flowchart, processing is first performed for the purpose of switching determination, and the number of spreading codes multiplexed in a received signal is detected (Step 80). After detection of the number of spreading codes, the detected number of spreading codes is compared with a predetermined threshold value (Step 82). If this comparison shows that the number of spreading codes is less than the predetermined threshold value, the system switches to the RAKE demodulation section 2 (Step 84). If, on the other hand, the number of spreading codes is greater than or equal to the predetermined threshold value, the system switches to the JD demodulation section 3 (Step 92).

After RAKE demodulation has been performed following switching to the RAKE demodulation section 2 when the number of spreading codes is less than the predetermined threshold value, error correction decoding is performed (Step 86). After error correction decoding has been performed, error detection processing is carried out (Step 88). In this error detection processing, the presence or absence of an error is determined (Step 90); if there is no error this processing is terminated, and if there is an error the system switches to the JD demodulation section 3 (Step 92). After the switch is made to the JD demodulation section 3 and JD demodulation has been performed, error correction decoding is carried out (Step 94). After error correction decoding has been carried out, this processing is terminated.

Thus, according to a demodulation apparatus of this embodiment, when there is an error in a RAKE demodulation result, JD demodulation is performed using RAKE demodulation result symbol information for the point in time at which that error occurred, thereby making it possible to keep error occurrence at a low level, and enabling reception quality to be improved. Also, since a switch is made to JD demodulation when there is an error in a RAKE demodulation result, power saving is achieved by setting a high threshold value so that RAKE demodulation, which requires low power consumption, is used as much as possible.

Moreover, since computation for performing RAKE demodulation processing in the JD demodulation section 3 can be omitted, the amount of processing involved in JD demodulation can be reduced. From the hardware standpoint, by making the RAKE demodulation section of the JD demodulation section 3 the RAKE demodulation section 2, it is possible to reduce the amount of processing involved in JD demodulation, and also to reduce costs.

Not only in this embodiment, but in all the above-described embodiments, using RAKE demodulated symbol information in JD demodulation enables the omission of computation corresponding to RAKE demodulation processing in the JD demodulation section 3. This makes it possible to reduce the amount of processing and storage apparatus capacity required for JD demodulation.

Furthermore, in the above-described embodiments, descriptions have covered RAKE demodulation and JD demodulation, but for RAKE demodulation, a demodulation method may be used whereby coherent detection or differentially coherent detection is performed after despreading, and for JD demodulation, another demodulation method that has an interference cancellation function may be used. Moreover, application is also possible with regard to Channel Equalization that cancels only the effects of multi-path interference. Information concerning this Channel Equalization is given in, for example, "Interference Cancellation vs. Channel Equalization and Joint Detection for the Downlink of C/TDMA Mobile Radio Concepts" (Bernd Steiner, Proceedings of EPMCC Conference Germany 1997, No.145, pp.253–260).

(Embodiment 8)

Figure 12:
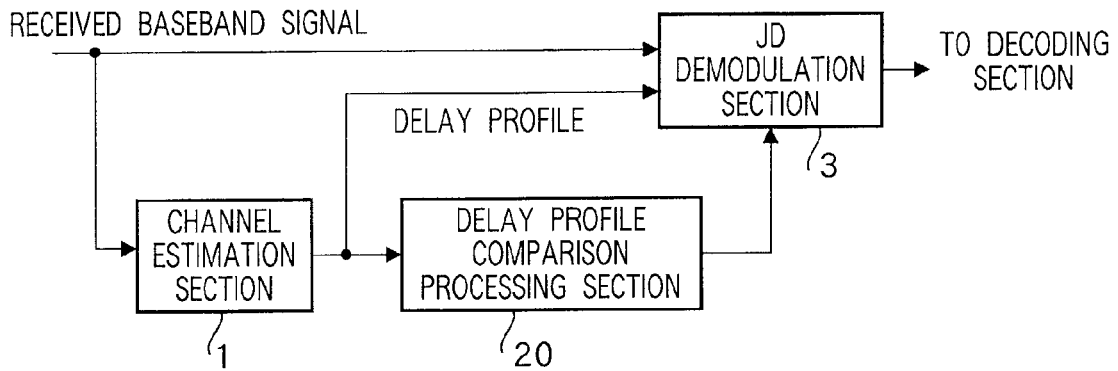
FIG. 12 is a block diagram showing the configuration of a demodulation apparatus according to Embodiment 8 of the present invention.
Figure 13:
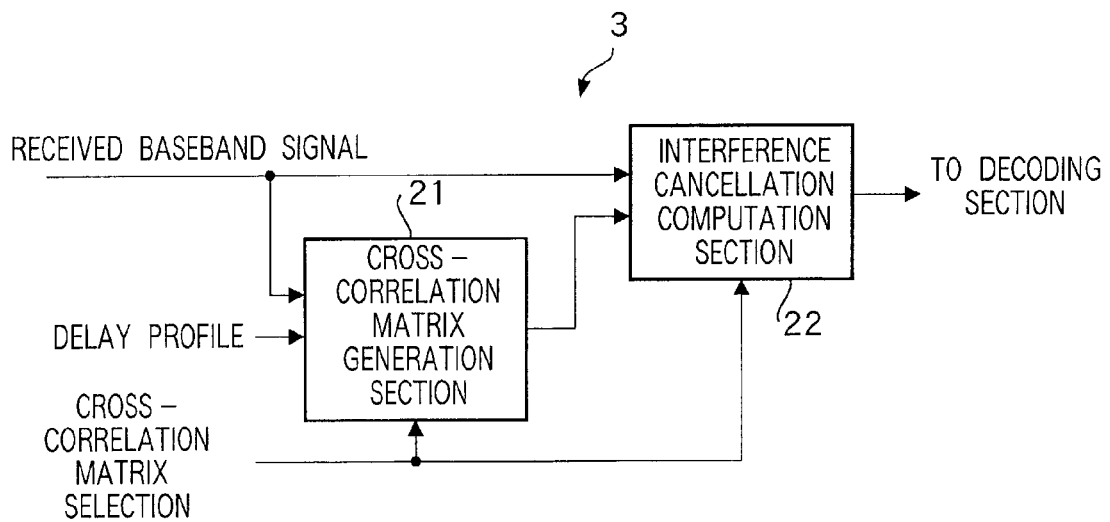
FIG. 13 is a block diagram showing the configuration of the joint detection demodulation section of a demodulation apparatus according to Embodiment 8 of the present invention.

FIG. 12 is a block diagram showing the configuration of a demodulation apparatus according to Embodiment 8 of the present invention, and FIG. 13 is a block diagram showing the configuration of the JD demodulation section 3 that is a component part of a demodulation apparatus according to this embodiment. Parts in FIG. 12 identical to those in FIG. 1 are assigned the same codes as in FIG. 1 and their explanations are omitted.

In FIG. 12, a demodulation apparatus according to this embodiment comprises a channel estimation section 1, a JD demodulation section 3, and a delay profile comparison processing section 20. As shown in FIG. 13, the JD demodulation section 3 is composed of a cross-correlation matrix generation section 21 and interference cancellation computation section 22. The channel estimation section 1 performs channel estimation using a known signal sequence included in a received signal, generates a delay profile for all users, and inputs this to the delay profile comparison processing section 20 and JD demodulation section 3. The delay profile comparison processing section 20 determines whether or not a cross-correlation matrix is to be generated based on the amount of change of the current delay profile with respect to the previous delay profile. That is to say, after obtaining the amount of change of the current delay profile with respect to the previous delay profile, the obtained amount of change is compared with a predetermined threshold value, and a selection result is output indicating that the previous cross-correlation matrix is to be used if the amount of change is less than the threshold value, or that a new cross-correlation matrix is to be generated if the amount of change greater than or equal to the threshold value. This selection result is input to the JD demodulation section 3. The delay profile comparison processing section 20 has a storage section (not shown) that stores the delay profile obtained this time for processing in the next received transmission unit.

The cross-correlation matrix generation section 21 of the JD demodulation section 3 carries out generation of a new cross-correlation matrix if the selection result is that a newly generated cross-correlation matrix is to be used, and does not carry out generation of a new cross-correlation matrix if the selection result is that the previously generated cross-correlation matrix is to be used. Also, if the selection result is that a new cross-correlation matrix is also to be used by the interference cancellation computation section 22 of the JD demodulation section 3, JD demodulation is performed using the cross-correlation matrix newly generated this time. If, on the other hand, the selection result is that the previously generated cross-correlation matrix is to be used, JD demodulation is performed using the previously generated cross-correlation matrix. The interference cancellation computation section 22 has a storage section (not shown) that stores the cross-correlation matrix used this time for use in demodulation next time. The result of demodulation by the JD demodulation section 3 is input to a decoding section (not shown).

Figure 14:
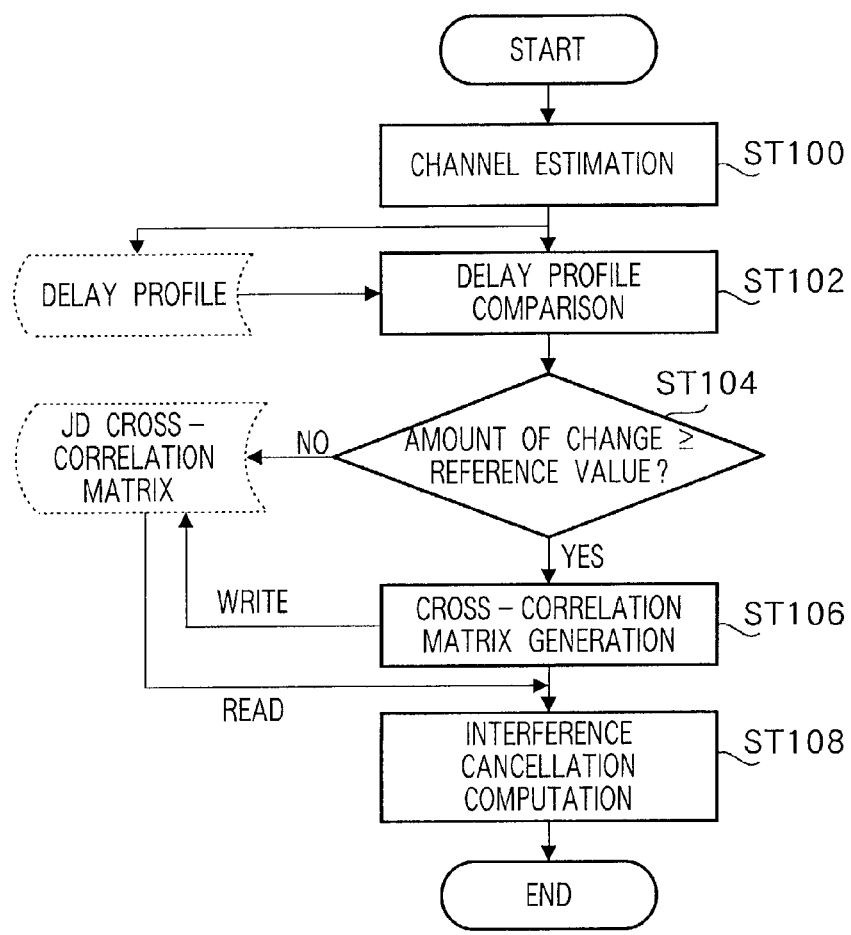
FIG. 14 is a flowchart showing the operation of a demodulation apparatus according to Embodiment 8 of the present invention.

FIG. 14 is a flowchart showing the operation of a demodulation apparatus according to this embodiment.

In this flowchart, first, channel estimation is performed and a delay profile is generated (Step 100). Next, the delay profile newly generated this time is compared with the stored previous delay profile, and the amount of change is calculated (Step 102). Then, after the amount of change has been calculated, this amount of change is compared with a predetermined threshold value, and it is determined whether or not a cross-correlation matrix is to be generated (Step 104). If this comparison shows that it is not necessary to generate a cross-correlation matrix (the NO case)-that is to say, if the amount of change of the delay profile is less than the threshold value-the previous cross-correlation matrix is read from the storage section (not shown) and interference cancellation computation is performed (Step 108). If, on the other hand, it is necessary to generate a new cross-correlation matrix (the YES case)-that is to say, if the amount of change of the delay profile is greater than or equal to the threshold value-a new cross-correlation matrix is generated (Step 106). After the new cross-correlation matrix has been generated, it is stored and is also used in interference cancellation computation (Step 108).

Thus, according to a demodulation apparatus of this embodiment, when a previously generated cross-correlation matrix can be employed as the cross-correlation matrix used in JD demodulation, that cross-correlation matrix is used and a new cross-correlation matrix is not generated, thereby enabling power to be saved during demodulation.

(Embodiment 9)

Figure 15:
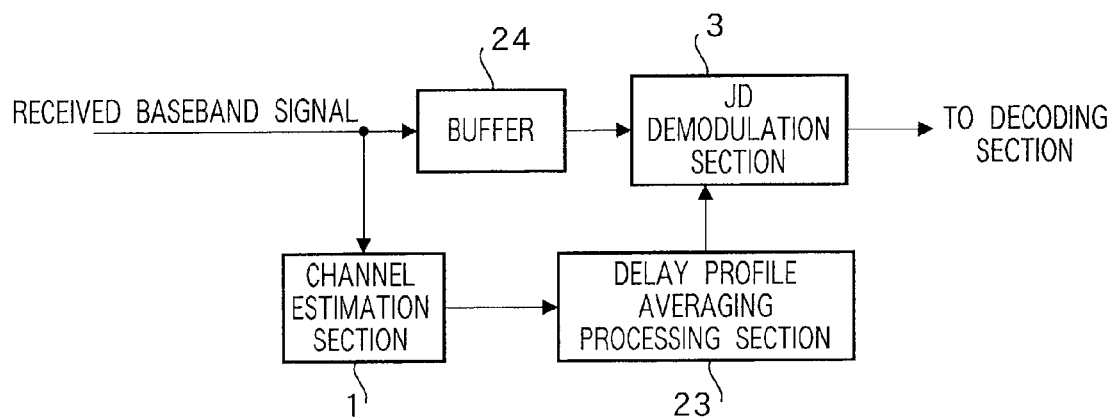
FIG. 15 is a block diagram showing the configuration of a demodulation apparatus according to Embodiment 9 of the present invention.

FIG. 15 is a block diagram showing the configuration of a demodulation apparatus according to Embodiment 9 of the present invention. Parts in FIG. 15 identical to those in FIG. 12 are assigned the same codes as in FIG. 12 and their explanations are omitted.

A demodulation apparatus according to this embodiment comprises a channel estimation section 1, a JD demodulation section 3, a delay profile averaging processing section 23, and a buffer 24. The delay profile averaging processing section 23 averages delay profiles over one or a plurality of transmission units and outputs the result to the JD demodulation section 3. The buffer 24 holds the received baseband signal obtained while the delay profile averaging processing section 23 is performing delay profile averaging processing. The JD demodulation section 3 generates a cross-correlation matrix to be used in JD demodulation from the input average delay profile, and performs JD demodulation processing on the received baseband signal for the averaging period. The result of JD demodulation is input to a decoding section (not shown).

Thus, according to a demodulation apparatus of this embodiment, delay profiles over one or a plurality of transmission units are averaged and the result is input to the JD demodulation section 3, and the received baseband signal during the delay profile averaging processing period is held in a buffer 24 and is input to the JD demodulation section 3 after delay profile averaging processing, thereby making possible JD demodulation that uses an averaged delay profile, and so making it possible to reduce the number of times of generation of a cross-correlation matrix, and enabling power to be saved during demodulation.

(Embodiment 10)

Figure 16:
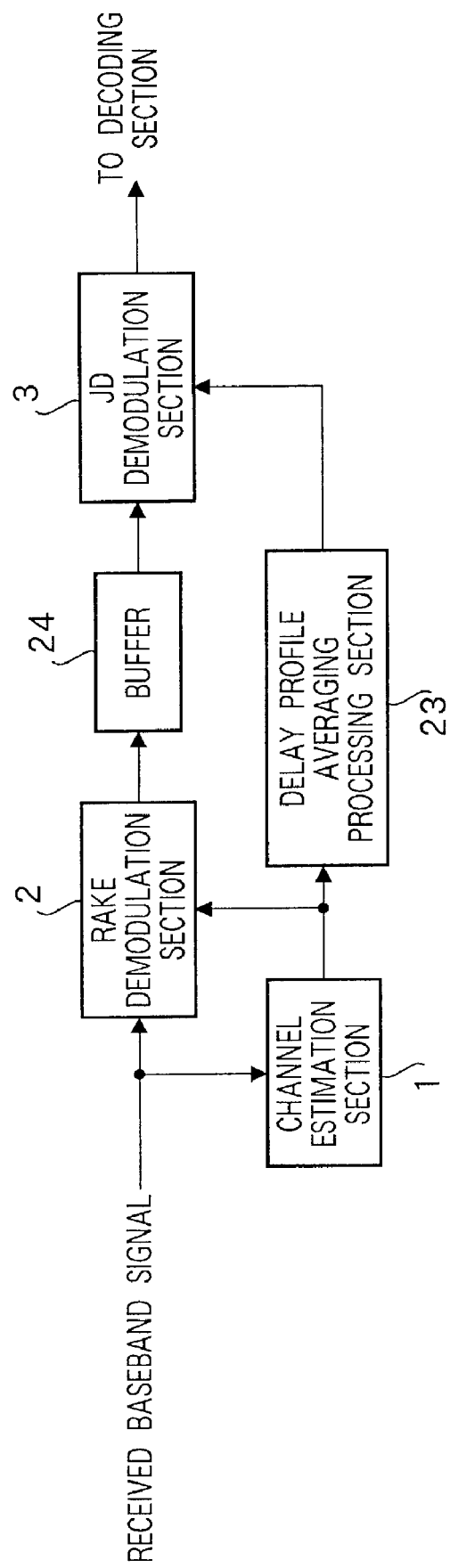
FIG. 16 is a block diagram showing the configuration of a demodulation apparatus according to Embodiment 10 of the present invention.

FIG. 16 is a block diagram showing the configuration of a demodulation apparatus according to Embodiment 10 of the present invention. Parts in FIG. 16 identical to those in FIG. 1 and FIG. 15 are assigned the same codes as in FIG. 1 and FIG. 15.

In the above-described demodulation apparatus according to Embodiment 9, a large-capacity buffer 24 is necessary due to the fact that a chip-rate or sample-rate received baseband signal is stored. In a demodulation apparatus according to this embodiment, a RAKE demodulation section 2 is added and RAKE demodulation processing is carried out for all users in the JD demodulation process, so that a buffer of small memory capacity can be used. As a result, only RAKE demodulated symbols need be stored in the buffer 24, and it is possible to use a buffer of small memory capacity.

Figure 17:
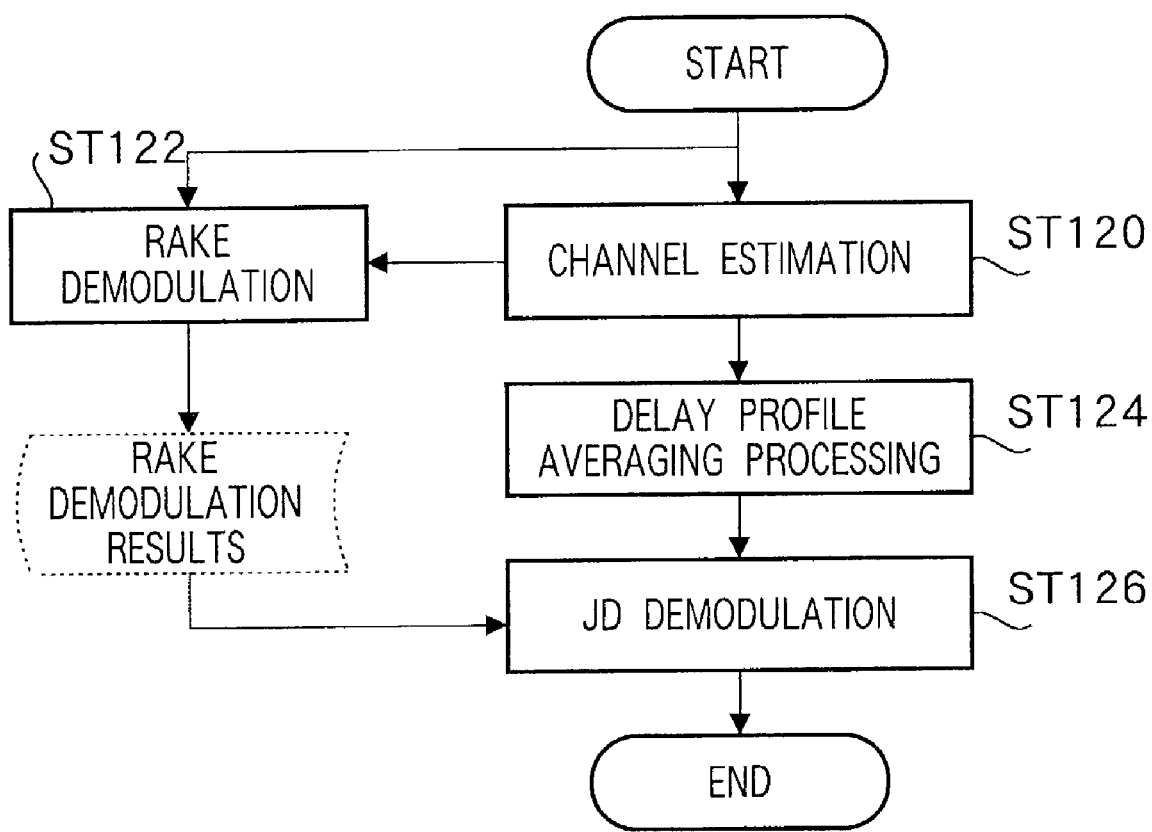
FIG. 17 is a flowchart showing the operation of a demodulation apparatus according to Embodiment 10 of the present invention.

FIG. 17 is a flowchart showing the operation of a demodulation apparatus according to this embodiment.

In this flowchart, first, channel estimation is performed and a delay profile is generated (Step 120), and then RAKE demodulation is performed (Step 122). Next, delay profiles over one or a plurality of transmission units are averaged (Step 124). Then JD demodulation is performed using the averaged delay profile and the RAKE demodulation result (Step 126).

Thus, according to a demodulation apparatus of this embodiment, a received baseband signal is RAKE demodulated over a delay profile averaging processing period and RAKE demodulated symbols thus obtained are stored, thereby making it possible to reduce memory capacity and to use a low-cost buffer of small memory capacity.

(Embodiment 11)

Figure 18:
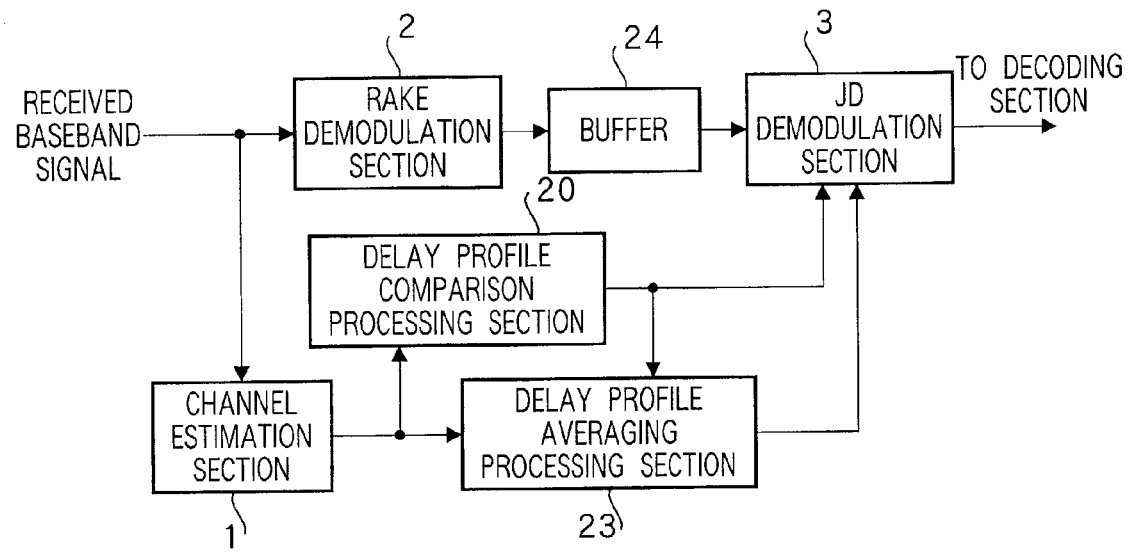
FIG. 18 is a block diagram showing the configuration of a demodulation apparatus according to Embodiment 11 of the present invention.

FIG. 18 is a block diagram showing the configuration of a demodulation apparatus according to Embodiment 11 of the present invention. Parts in FIG. 18 identical to those in FIG. 1, FIG. 12, and FIG. 15 are assigned the same codes as in FIG. 1, FIG. 12, and FIG. 15.

In a demodulation apparatus according to this embodiment, a delay profile comparison processing section 20 is provided in addition to the configuration of the above-described demodulation apparatus according to Embodiment 10. This delay profile comparison processing section 20 calculates the amount of change of the current delay profile with respect to the delay profile at the start of averaging, and determines whether or not that amount of change is greater than or equal to a predetermined threshold value. The delay profile averaging processing section 23 determines the delay profile averaging period in accordance with the result of delay profile comparison processing section 20 processing. In this case, processing is performed so that averaging is discontinued if the amount of change of the delay profile is greater than or equal to the threshold value, and averaging is continued if the amount of change of the delay profile is less than the threshold value. If the result of processing by the delay profile comparison processing section 20 is that averaging is to be discontinued, the JD demodulation section 3 reads the RAKE demodulation section 2 demodulation result from the buffer 24 and performs JD demodulation. The result of JD demodulation is input to a decoding section (not shown). The reason for controlling the averaging period in accordance with the amount of change of the delay profile is that, if the averaging period is extended regardless of the fact that the amount of change of the delay profile has increased, the error between the actual value and the averaged value will be large and quality will degrade. When the amount of change of the delay profile is large, a cross-correlation matrix is generated using a shorter averaging period.

Thus, according to a demodulation apparatus of this embodiment, the averaging period is controlled in accordance with the amount of change of the delay profile, thereby making it possible to prevent degradation of reception quality.

(Embodiment 12)

Figure 19:
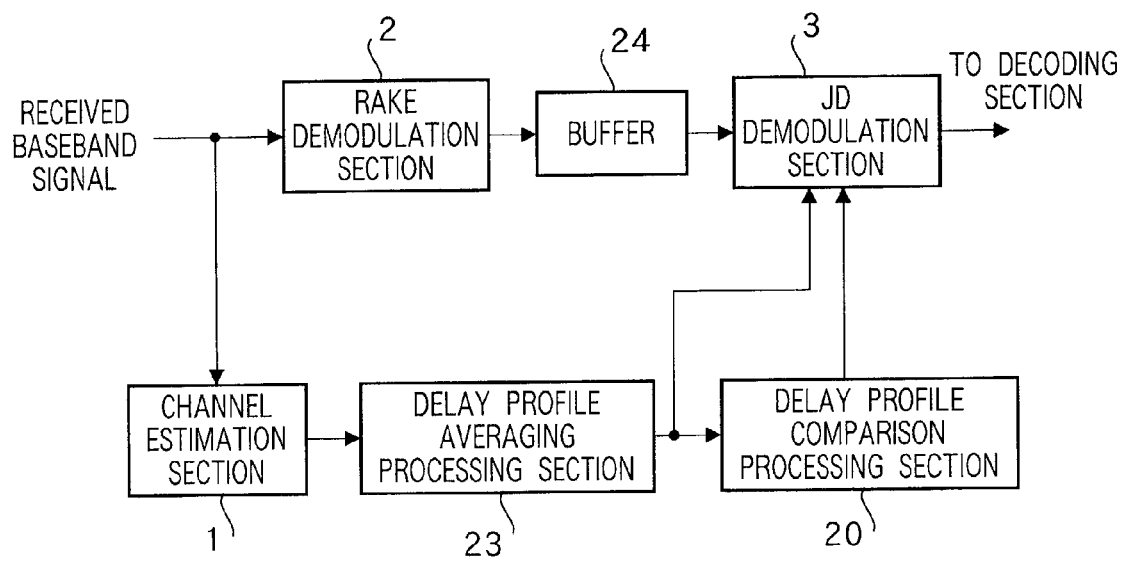
FIG. 19 is a block diagram showing the configuration of a demodulation apparatus according to Embodiment 12 of the present invention.

FIG. 19 is a block diagram showing the configuration of a demodulation apparatus according to Embodiment 12 of the present invention. Parts in FIG. 19 identical to those in FIG. 1, FIG. 12, and FIG. 15 are assigned the same codes as in FIG. 1, FIG. 12, and FIG. 15.

In a demodulation apparatus according to this embodiment, the delay profile comparison processing section 20 shown in the above-described demodulation apparatus according to Embodiment 11 is provided after the delay profile averaging processing section 23 shown in that demodulation apparatus according to Embodiment 11. The delay profile comparison processing section 20 calculates the amount of change of the current average delay profile with respect to the previous average delay profile, and performs selection processing for the cross-correlation matrix to be used in JD demodulation based on that amount of change. That is to say, a selection result is input to the JD demodulation section 3 such that the previous cross-correlation matrix is used when the amount of change is less than a predetermined threshold value, and a cross-correlation matrix is newly generated from the current average delay profile when the amount of change is greater than or equal to the predetermined threshold value.

The JD demodulation section 3 performs processing for generating a cross-correlation matrix from the current delay profile or using the previous cross-correlation matrix in accordance with the selection result from the delay profile comparison processing section 20, and performs JD demodulation for RAKE demodulated symbols of the current averaging period. The result of JD demodulation is input to a decoding section (not shown).

Thus, according to a demodulation apparatus of this embodiment, a cross-correlation matrix is reused in accordance with the amount of change of the averaged delay profile, making generation of a new cross-correlation matrix unnecessary to that extent, and thus enabling power to be saved during demodulation.

(Embodiment 13)

Figure 20:
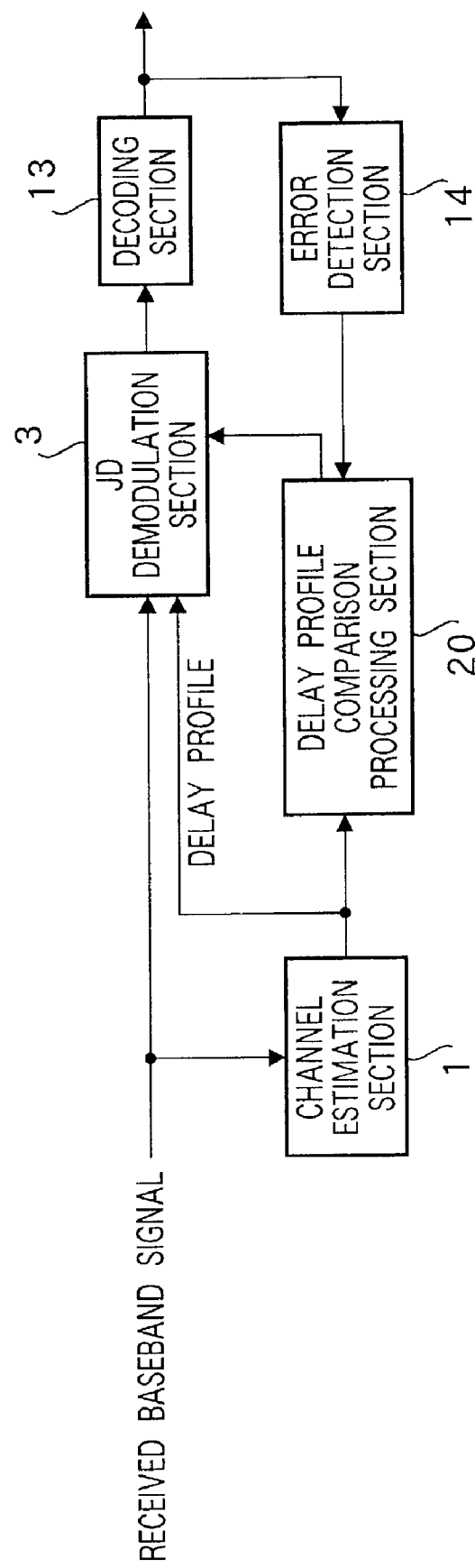
FIG. 20 is a block diagram showing the configuration of a demodulation apparatus according to Embodiment 13 of the present invention.

FIG. 20 is a block diagram showing the configuration of a demodulation apparatus according to Embodiment 13 of the present invention. Parts in FIG. 20 identical to those in FIG. 10 and FIG. 12 are assigned the same codes as in FIG. 10 and FIG. 12.

In a demodulation apparatus according to this embodiment, a decoding section 13 that decodes the JD demodulation section 3 demodulation result, and an error detection section (corresponding to the detecting means and threshold value controlling means in claim 19) 14 that detects decoded bit errors and inputs the result to the delay profile comparison processing section 20 are provided in addition to the configuration of the above-described demodulation apparatus according to Embodiment 8.

The demodulation result from the JD demodulation section 3 is input to the decoding section 13, and decoded bits are output. These decoded bits are input to the error detection section 14, where error detection is performed. If the error detection section 14 detects an error in decoded bits, it performs control that changes the threshold value in the delay profile comparison processing section 20. In this case, threshold value change control is performed until errors are no longer detected in decoded bits. When the threshold value is changed, a situation in which the threshold value is lost track of can be prevented by returning to the initial value, or returning to the pre-change value, following the elapse of a predetermined period after errors are no longer detected in decoded bits.

Figure 21:
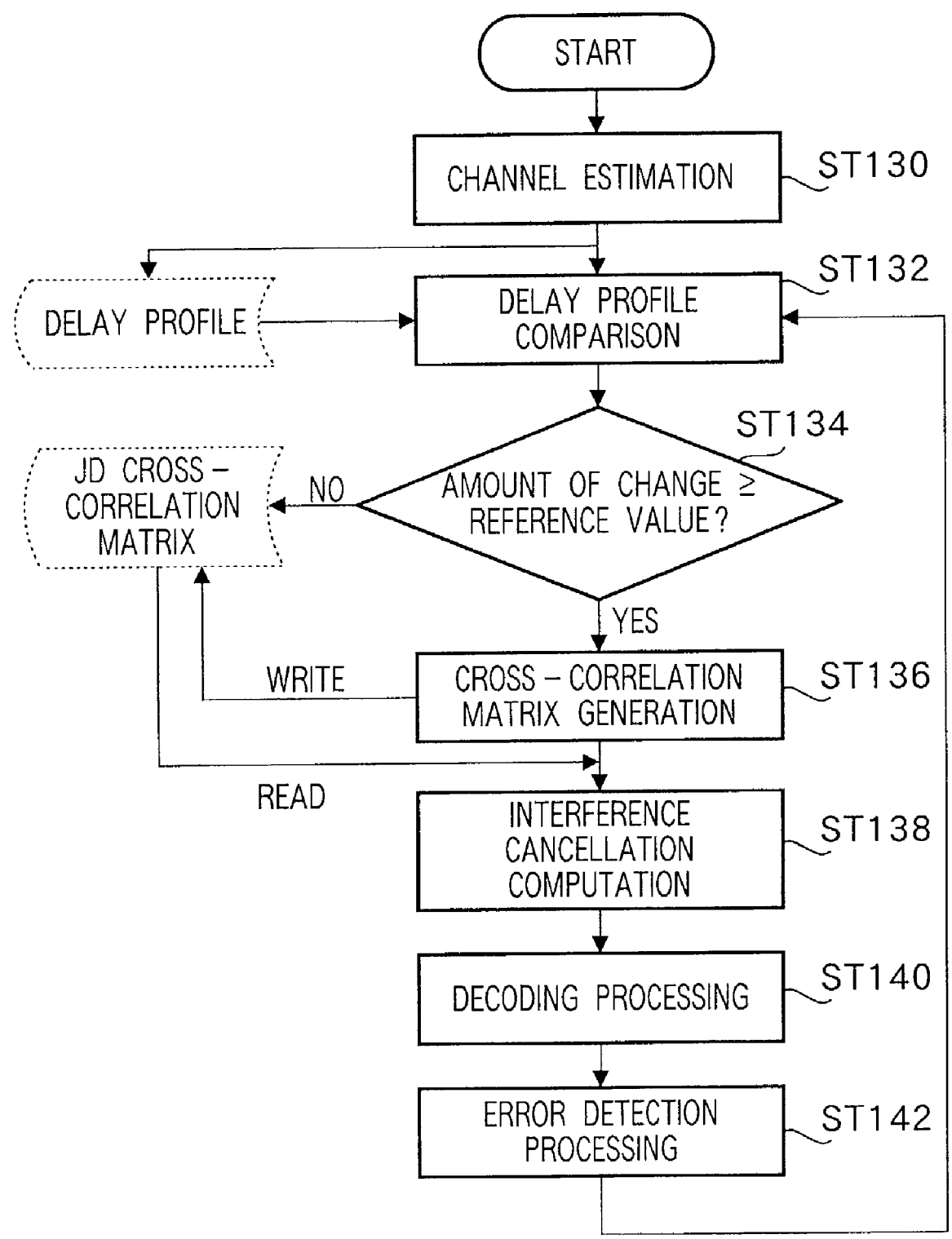
FIG. 21 is a flowchart showing the operation of a demodulation apparatus according to Embodiment 13 of the present invention.

FIG. 21 is a flowchart showing the operation of a demodulation apparatus according to this embodiment.

In this flowchart, first, channel estimation is performed and a delay profile is generated (Step 130). Next, the delay profile newly generated this time is compared with the stored previous delay profile, and the amount of change is calculated (Step 132). Then the calculated amount of change is compared with a predetermined threshold value, and based on the result it is determined whether or not a cross-correlation matrix is to be generated (Step 134). If it is determined that it is not necessary to generate across-correlation matrix (the NO case)—that is to say, if the amount of change of the delay profile is less than the predetermined threshold value—the previous cross-correlation matrix is read from the storage section (not shown) and interference cancellation computation is performed (Step 138). If, on the other hand, it is necessary to generate a new cross-correlation matrix (the YES case)—that is to say, if the amount of change of the delay profile is greater than or equal to the predetermined threshold value—a new cross-correlation matrix is generated (Step 136). When a cross-correlation matrix has been newly generated, it is stored in the storage section (not shown) and is also used in interference cancellation computation (Step 138). After interference cancellation computation has been performed, decoding processing is carried out (Step 140). After the decoding processing, error detection processing is performed (Step 142). If an error is detected in a decoded bit in this error detection processing, control is performed that changes the threshold value in delay profile comparison processing (Step 132). This control is performed until errors are no longer detected.

Thus, according to a demodulation apparatus of this embodiment, the threshold value used in delay profile comparison processing is changed in accordance with error detection results, enabling decoded bit errors to be reduced and reception quality to be improved.

(Embodiment 14)

Figure 22:
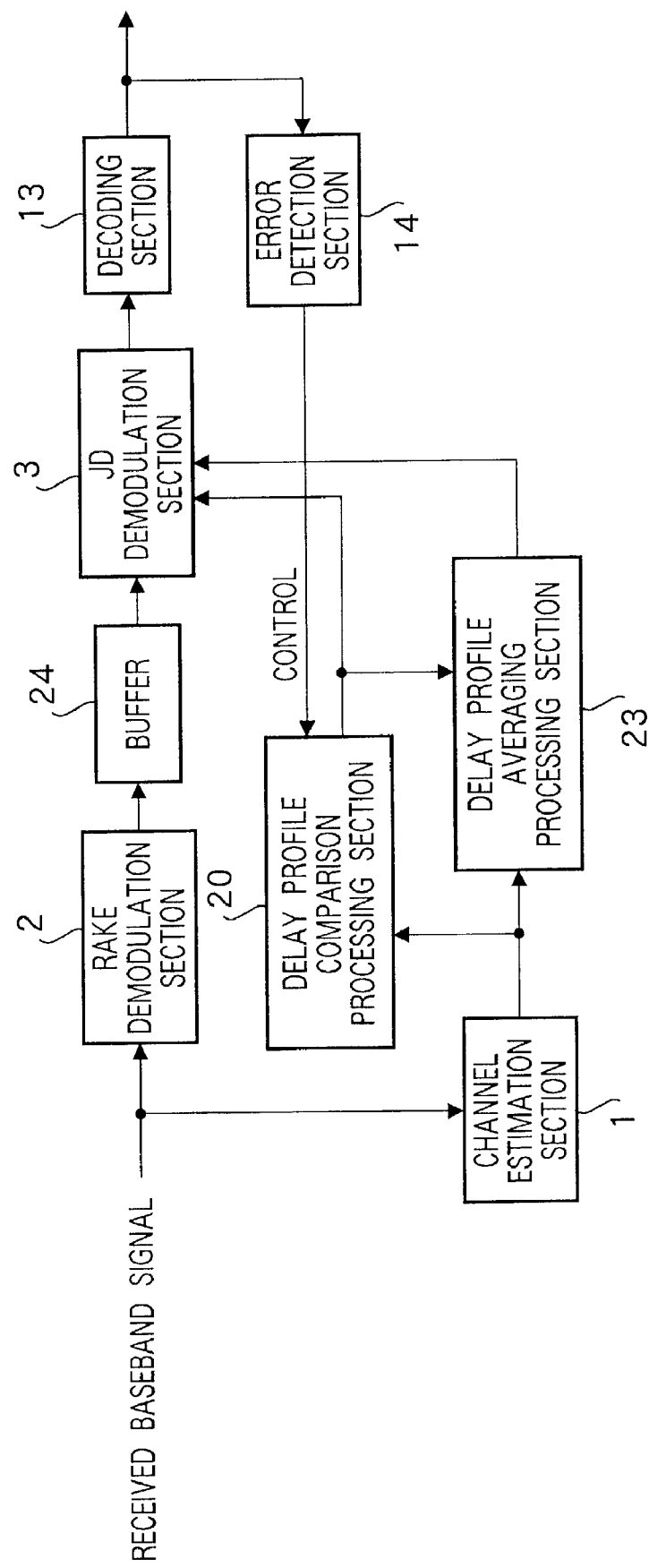
FIG. 22 is a block diagram showing the configuration of a demodulation apparatus according to Embodiment 14 of the present invention.

FIG. 22 is a block diagram showing the configuration of a demodulation apparatus according to Embodiment 14 of the present invention. Parts in FIG. 22 identical to those in FIG. 10 and FIG. 18 are assigned the same codes as in FIG. 10 and FIG. 18.

A demodulation apparatus according to this embodiment is an application example of the above-described demodulation apparatus according to Embodiment 11, and has an error detection section 14 in addition to the configuration of the demodulation apparatus according to Embodiment 11.

The delay profile comparison processing section 20 calculates the amount of change of the current delay profile with respect to the delay profile at the start of averaging, and performs processing so that averaging is discontinued if the calculated amount of change is greater than or equal to a predetermined threshold value, and averaging is continued if the calculated amount of change is less than the predetermined threshold value. If the error detection section 14 detects an error in decoded bits from the decoding section 13, it performs control that changes the threshold value in the delay profile comparison processing section 20. This control is performed until errors are no longer detected. When the threshold value is changed, a situation in which the threshold value is lost track of can be prevented by returning to the initial value, or returning to the pre-change value, following the elapse of a predetermined period after errors are no longer detected.

Thus, according to a demodulation apparatus of this embodiment, the threshold value used in delay profile comparison processing is changed in accordance with error detection results, enabling decoded bit errors to be reduced and reception quality to be improved.

(Embodiment 15)

Figure 23:
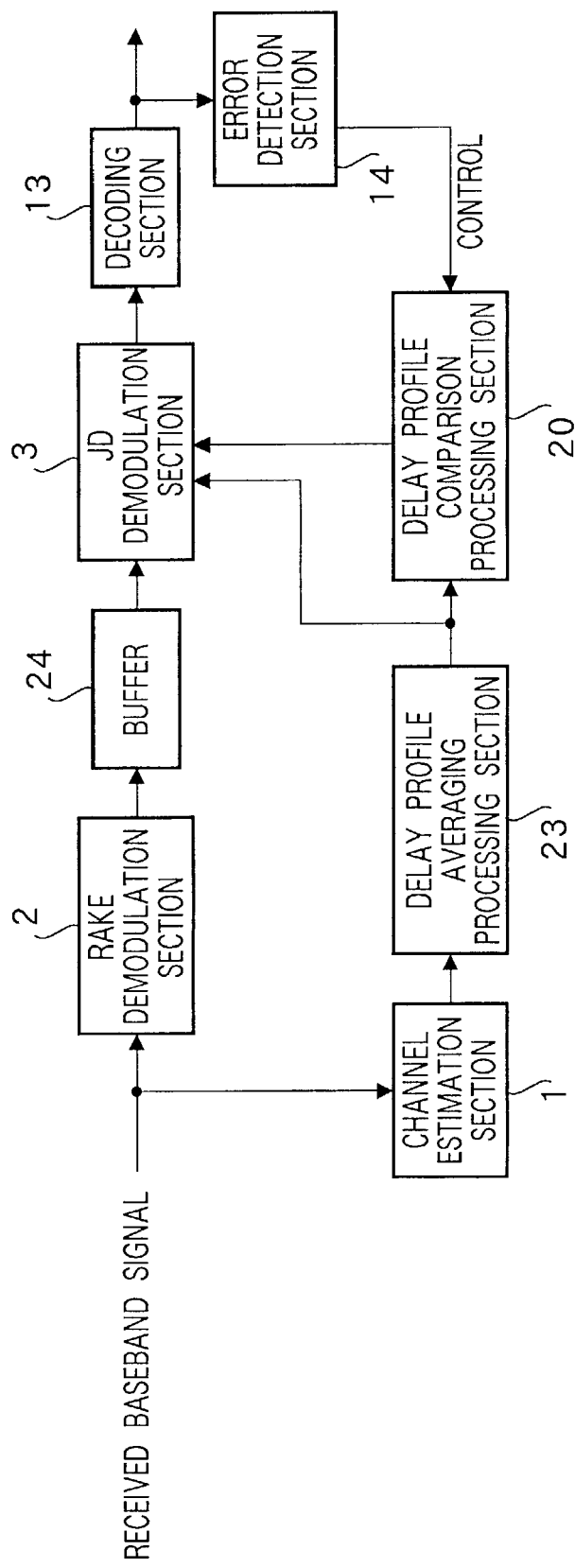
FIG. 23 is a block diagram showing the configuration of a demodulation apparatus according to Embodiment 15 of the present invention.
Figure 24:
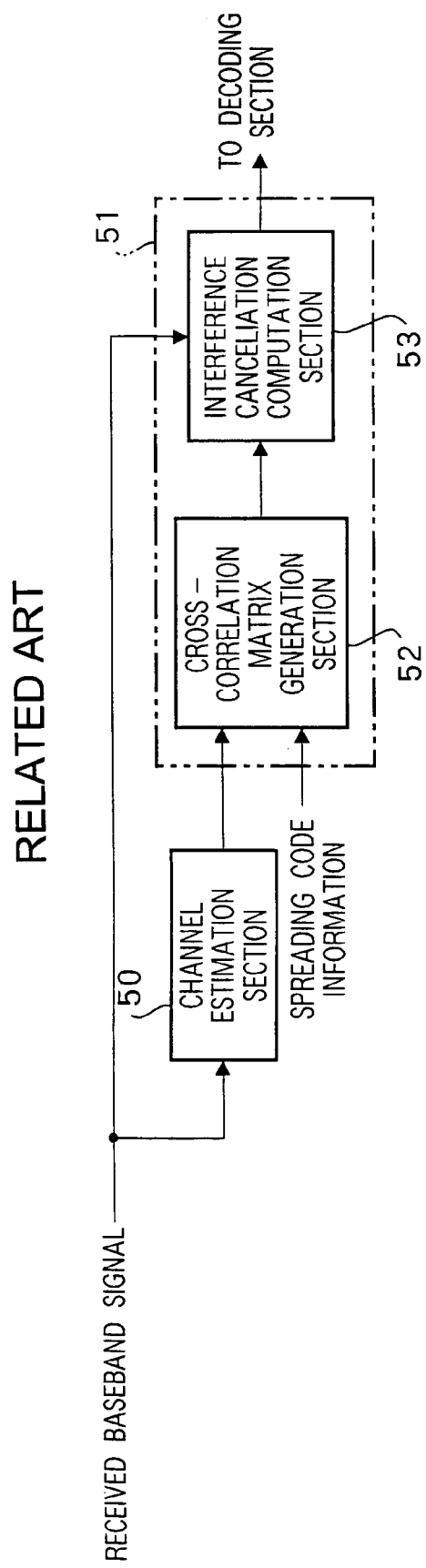
FIG. 24 is a block diagram showing the configuration of a conventional demodulation apparatus.

FIG. 23 is a block diagram showing the configuration of a demodulation apparatus according to Embodiment 15 of the present invention. Parts in FIG. 23 identical to those in FIG. 11 and FIG. 18 are assigned the same codes as in FIG. 11 and FIG. 18.

A demodulation apparatus according to this embodiment is an application example of the above-described demodulation apparatus according to Embodiment 12, and has an error detection section 14 in addition to the configuration of the demodulation apparatus according to Embodiment 12. The delay profile comparison processing section 20 calculates the amount of change of the current average delay profile with respect to the previous average delay profile, and performs selection processing for the cross-correlation matrix to be used in JD demodulation based on the calculated amount of change. That is to say, a selection result is input to the JD demodulation section 3 such that the previous cross-correlation matrix is used when the amount of change is less than a threshold value, and a new cross-correlation matrix is generated from the current average delay profile when the amount of change is greater than or equal to the threshold value. If the error detection section 14 detects an error in decoded bits from the decoding section 13, it performs control that changes the threshold value in the delay profile comparison processing section 20. This control is performed until errors are no longer detected. When the threshold value is changed, a situation in which the threshold value is lost track of can be prevented by returning to the initial value, or returning to the pre-change value, following the elapse of a predetermined period after errors are no longer detected.

Thus, according to a demodulation apparatus of this embodiment, the threshold value used in delay profile comparison processing is changed in accordance with error detection results, enabling decoded bit errors to be reduced and reception quality to be improved.

In the above embodiments, when a cross-correlation matrix is not newly generated the cross-correlation matrix generated on the previous occasion is used, but it is not absolutely necessary for the cross-correlation matrix generated on the previous occasion to be used, and the cross-correlation matrix generated on the occasion before last, for example, may be used instead. The key point is that if a cross-correlation matrix generated in the past can be used, it should be used.

As described above, according to the present invention, switching is performed between RAKE demodulation and JD demodulation in accordance with reception conditions, thereby making it possible to provide a demodulation apparatus with lower power consumption than a conventional demodulation apparatus that uses only JD demodulation.

Moreover, according to the present invention, the number of times of generation of a cross-correlation matrix used in JD demodulation can be reduced, enabling power to be saved during demodulation.

This application is based on Japanese Patent Application No.2000-300148 and Japanese Patent Application No.2000-300790 filed on Sep. 29, 2000, entire contents of which are expressly incorporated by reference herein.

INDUSTRIAL APPLICABILITY

The present invention is suitable for use in a CDMA mobile communication system.

The invention claimed is:

1. A demodulation apparatus comprising:
a joint detection demodulator that demodulates by joint detection;
a RAKE demodulator that demodulates by RAKE;
a switching component that selects either the joint detection demodulator or the RAKE demodulator to demodulate a received signal;
a switching determining component that determines, in accordance with a reception condition of the received signal, which demodulator is selected by the switching component;
a storage component that stores a RAKE demodulation result provided by the RAKE demodulator when the RAKE demodulator is selected to demodulate the received signal; and
an error detector that detects an error in a demodulation result provided by the selected demodulator, wherein
when the error detector detects an error in the demodulation result stored to the storage component, the switching determining component controls the switch to select the joint detection demodulator to demodulate the received signal and the storage component provides the stored RAKE demodulation result to the joint detection demodulator for use in joint detection demodulating the received signal.

2. A demodulation method comprising the steps of:

determining a reception condition and switching to either a first demodulation by joint detection or a second demodulation by RAKE based on the determination result;

detecting an error in a demodulation result when said first demodulation is switched to said second demodulation;

storing the demodulation result; and switching from said second demodulation to said first demodulation if an error is detected in said demodulation result, and performing said first demodulation using the stored demodulation result.

* * * * *